Figure 27:
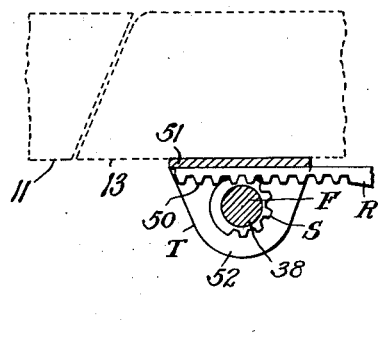

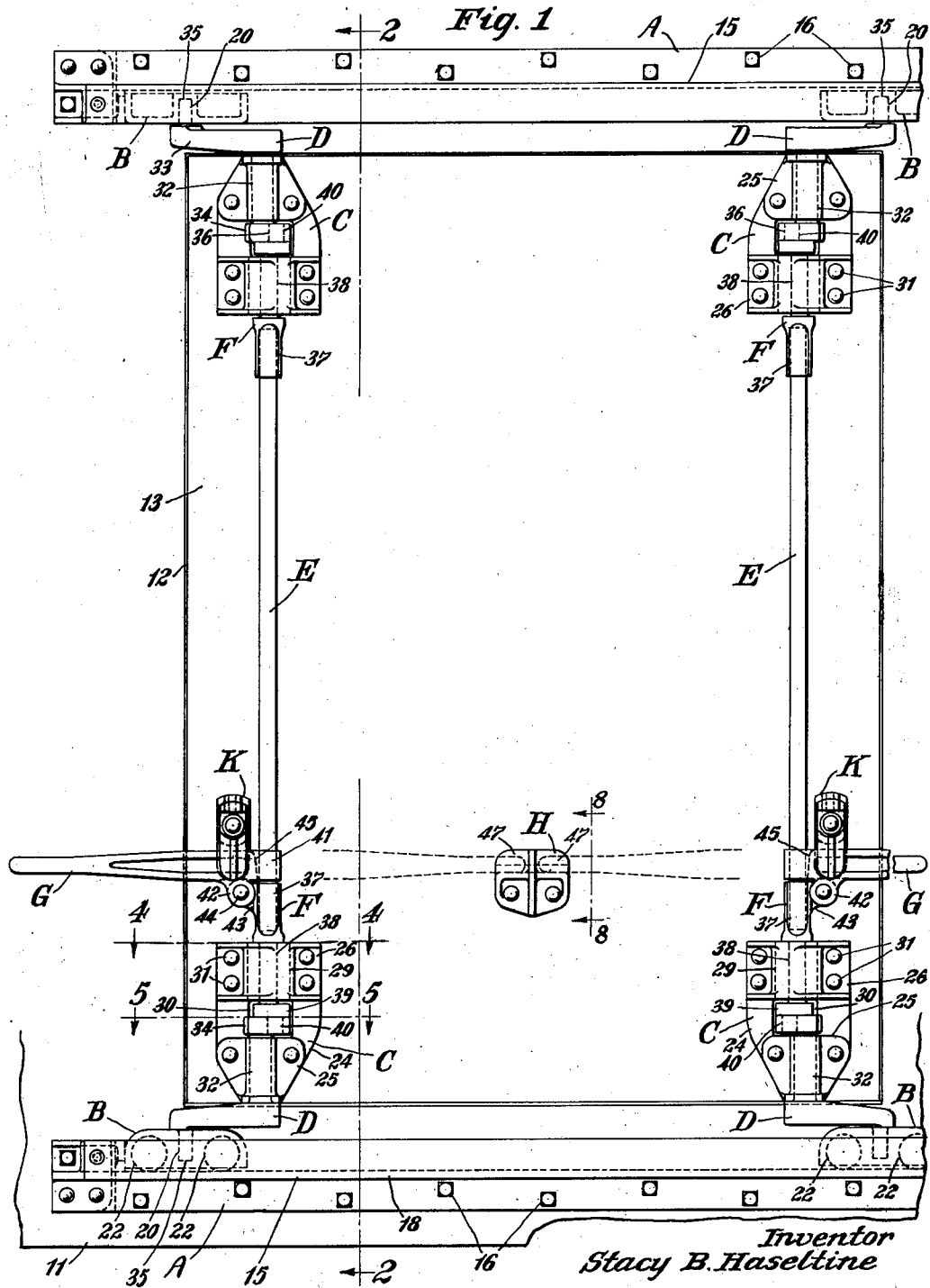

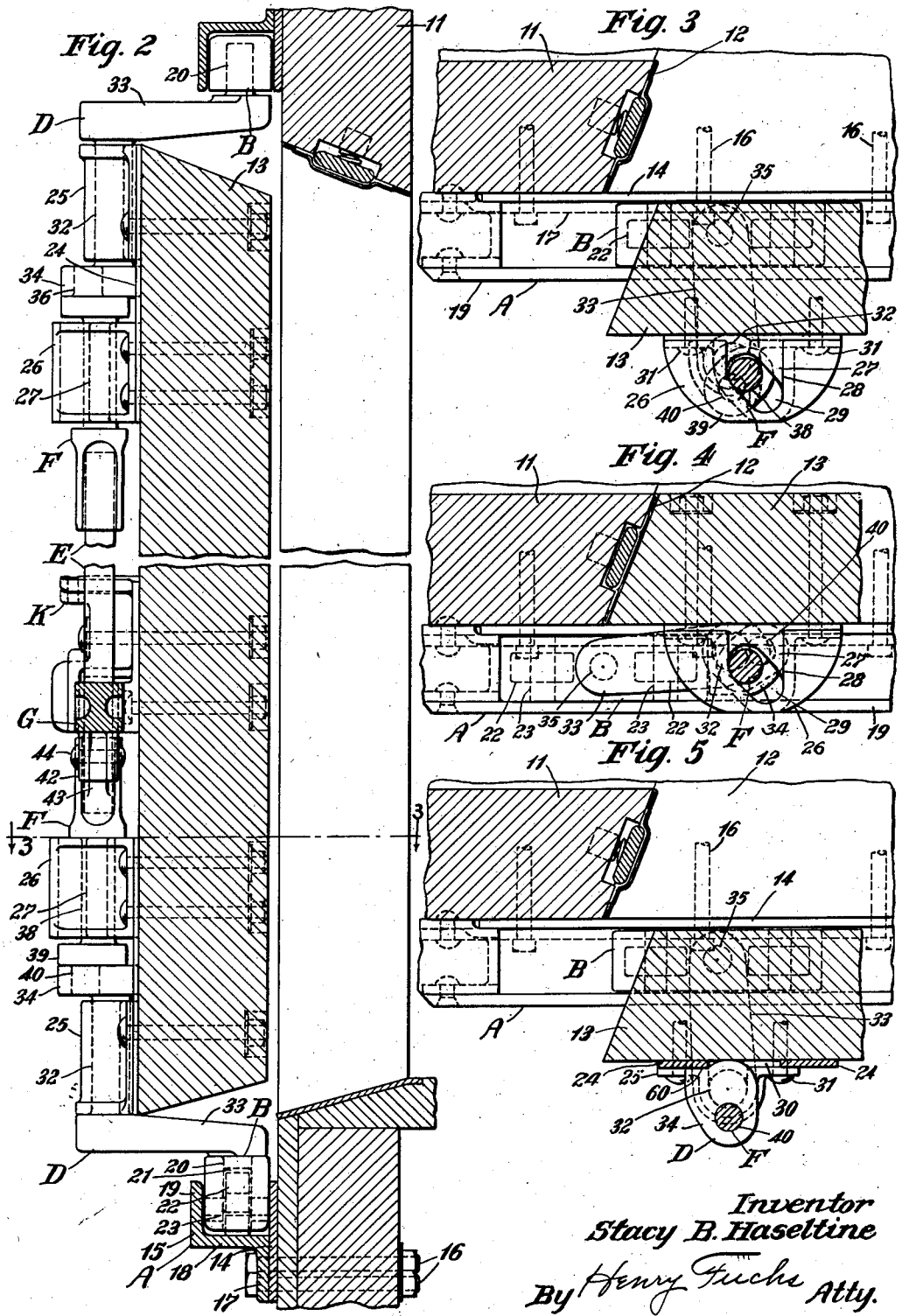

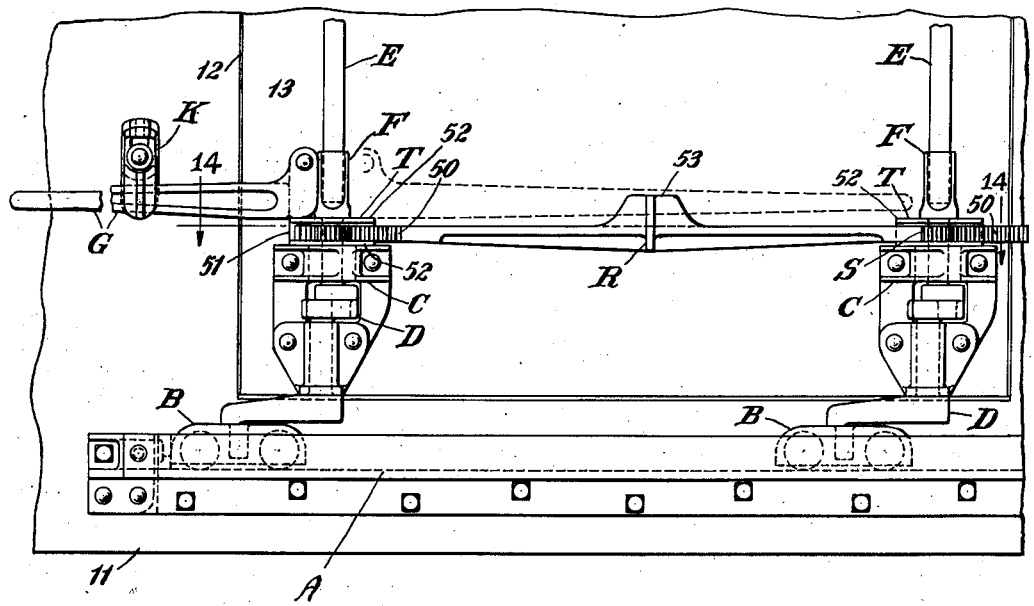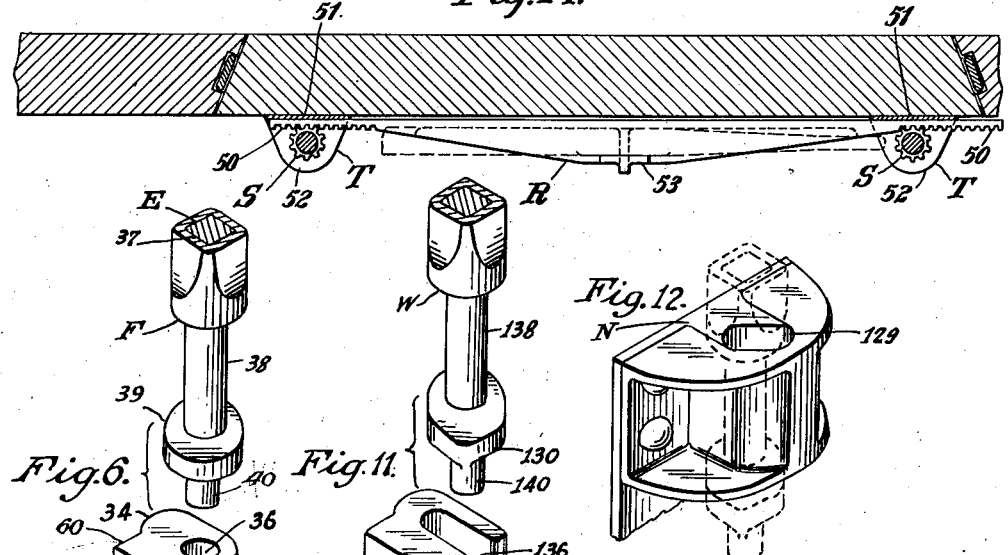

June 15, 1937.  S. B. HASELTINE  2,083,708
REFRIGERATOR CAR DOOR
Filed April 20, 1934  7 Sheets-Sheet 4
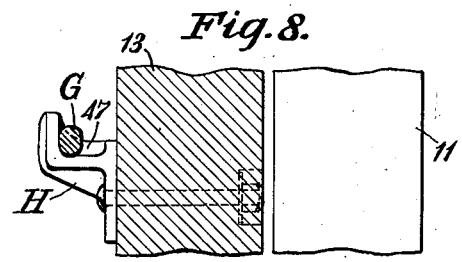
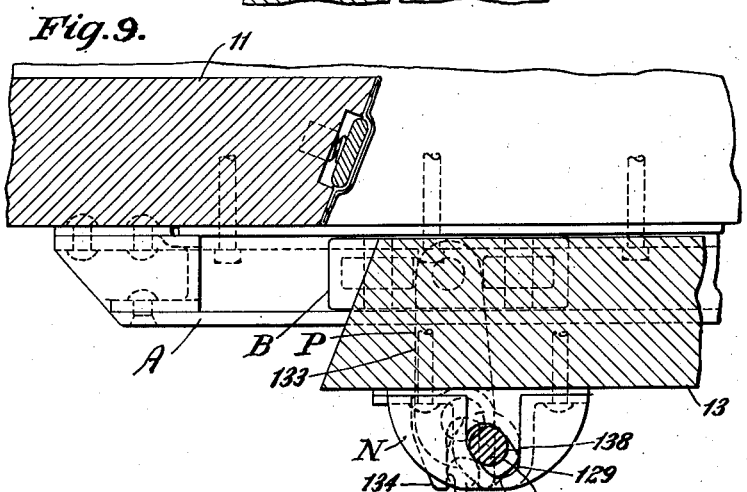
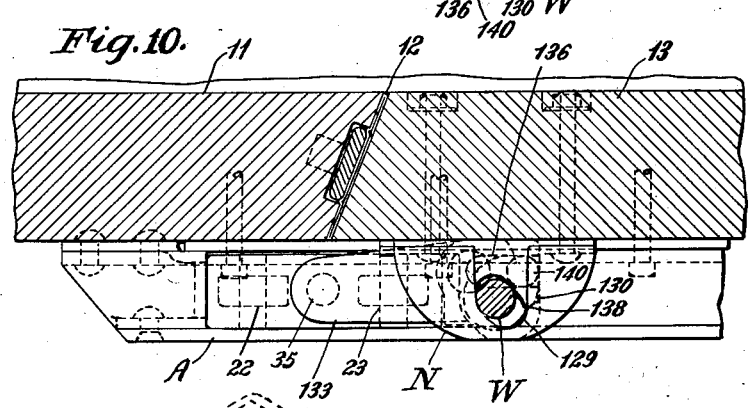
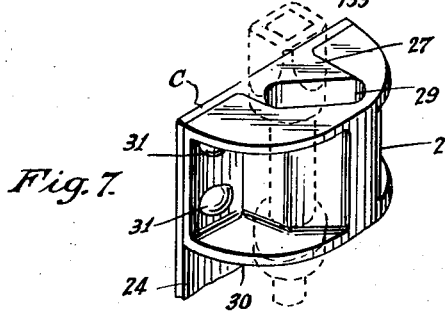
Inventor
Stacy B. Haseltine
By Henry Fuchs Atty.

June 15, 1937.  S. B. HASELTINE  2,083,708
REFRIGERATOR CAR DOOR
Filed April 20, 1934  7 Sheets-Sheet 5
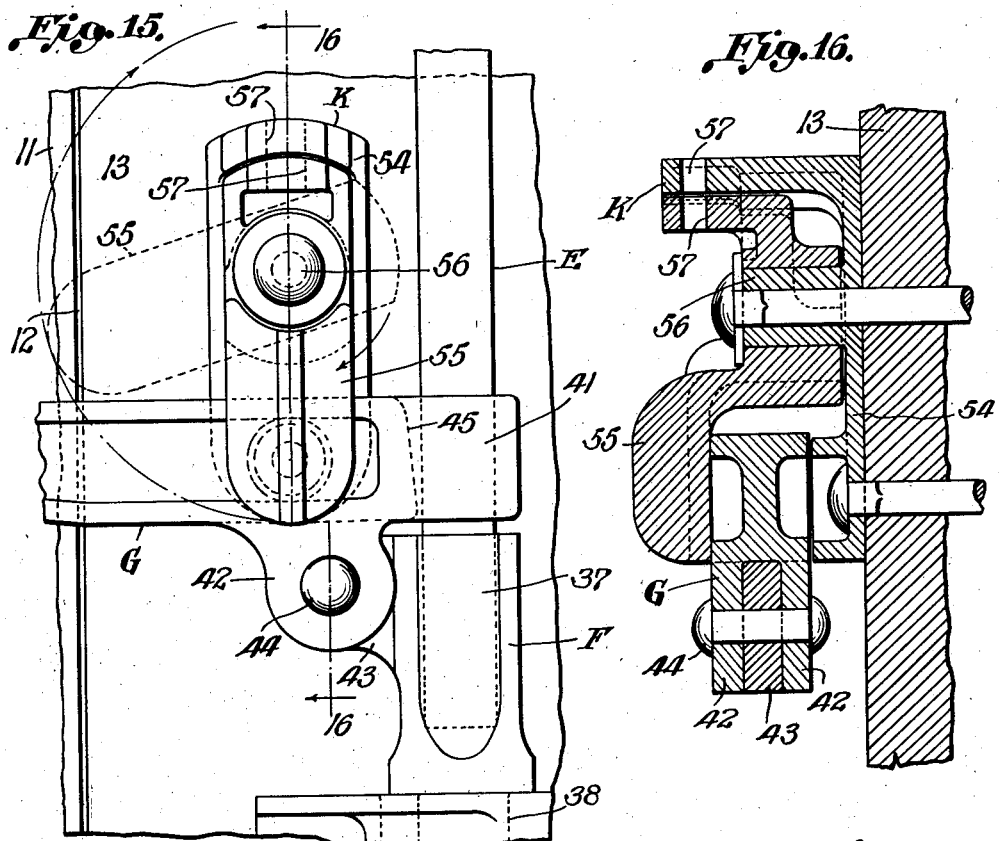
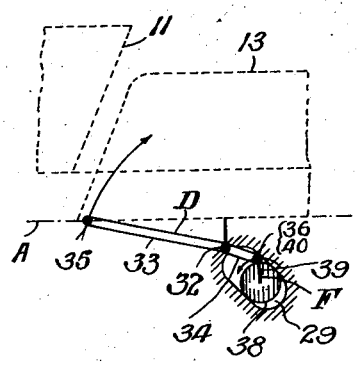
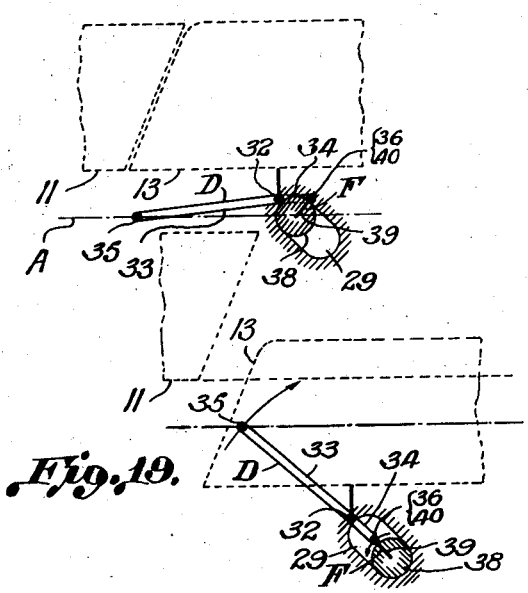
Inventor:
Stacy B. Haseltine
By Henry Fuchs
Atty.

June 15, 1937. S. B. HASELTINE 2,083,708
REFRIGERATOR CAR DOOR
Filed April 20, 1934 7 Sheets-Sheet 6
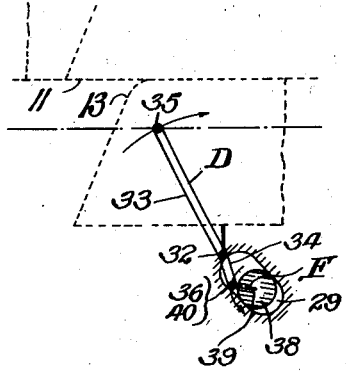
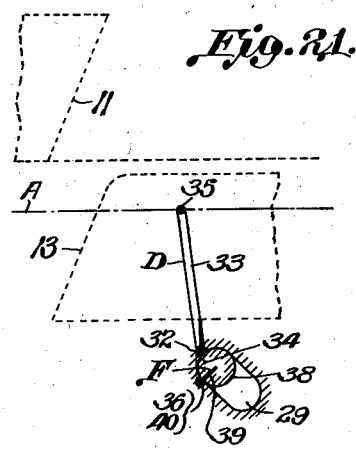
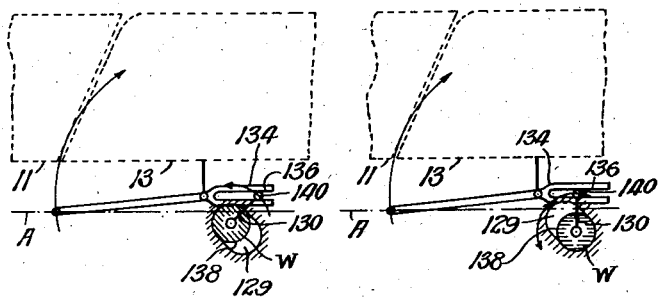
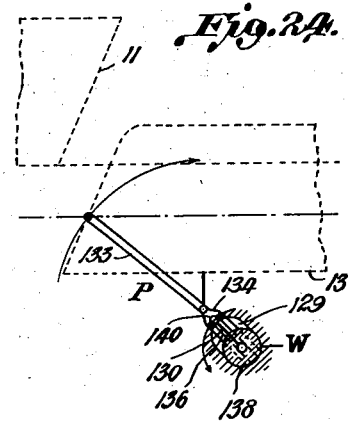
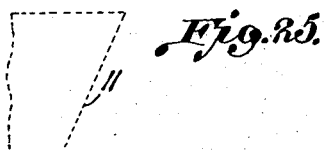
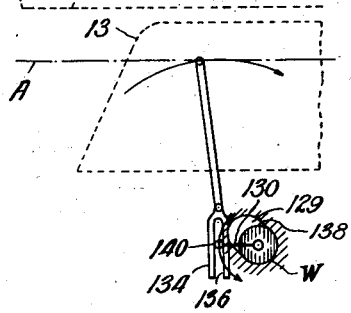
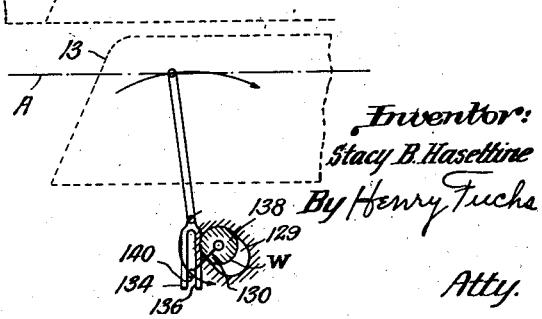
Inventor:
Stacy B. Haseltine
By Henry Fuchs
Atty.

Inventor:
Stacy B. Haseltine
By Henry Fuchs
Atty.

Patented June 15, 1937

2,083,708

UNITED STATES PATENT OFFICE 2,083,708

REFRIGERATOR CAR DOOR

Stacy B. Haseltine, Chicago, Ill., assignor to W. H. Miner, Inc., Chicago, Ill., a corporation of Delaware Application April 20, 1934, Serial No. 721,514

11 Claims. (Cl. 20—23)

This invention relates to improvements in refrigerator car doors.

One object of the invention is to provide a door construction for refrigerator cars comprising a single sliding door member for closing the door opening of the car, wherein simple and efficient manually actuated, power transmitting means is provided for moving the door into and out of the door opening, so designed that the power is greatly multiplied during the initial opening and the final closing movements of the door.

A further object of the invention is to provide means of the character described in the preceding paragraph, which is so mounted and arranged that the projection of the operating parts thereof will not exceed certain predescribed limits so that the mechanism will clear the usual loading platform structures and all other obstructions encountered in standard railway practice.

A more specific object of the invention is to provide a combined supporting and operating mechanism for sliding doors for refrigerator cars, wherein the combined mechanism is movable along tracks mounted on the car to permit sliding of the door clear of the door opening, and said mechanism is operable to quickly move the door either laterally inward toward or laterally outward away from the door opening and also effect either final forcible entry of the door into the opening to tightly close the same or withdrawal of the door with great force from said opening to initiate complete release of the door from engagement with the walls of the door opening and to remove the same from said opening.

A still further object of the invention is to provide in a refrigerator car, a single sliding door for closing the door opening of the car, and means for slidingly supporting the door on tracks mounted on the car, wherein the supporting means comprises swingable arms which are journaled at their outer ends on the door for swinging movement about vertical axes and have their inner ends swingingly supported on carriers slidable on the tracks for rotation about vertical axes and wherein the arms are positively rotated about the pivotal axes of their outer ends by manually operated mechanism which effects swinging movement of the arms to move the door inwardly and outwardly of the door opening with multiplication of the actuating power during the final closing and opening movements of said door.

Other objects of the invention will more clearly appear from the description and claims hereinafter following.

Figure 28:
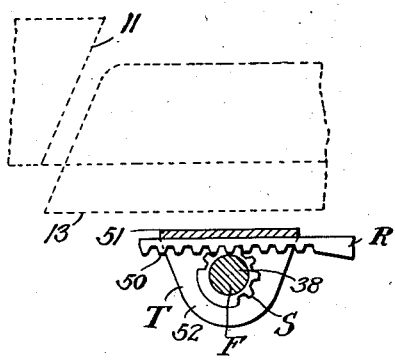
Figure 29:
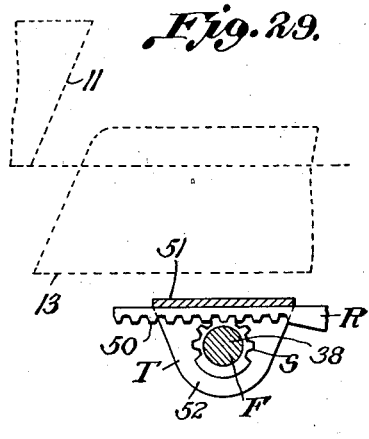
Figure 30:
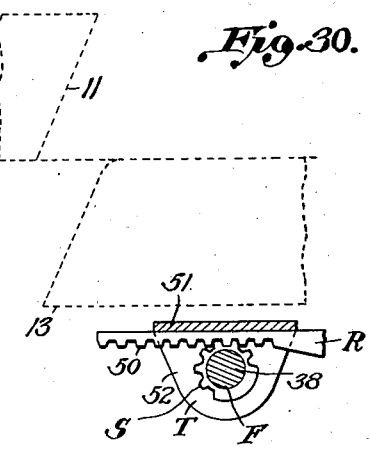
Figure 31:
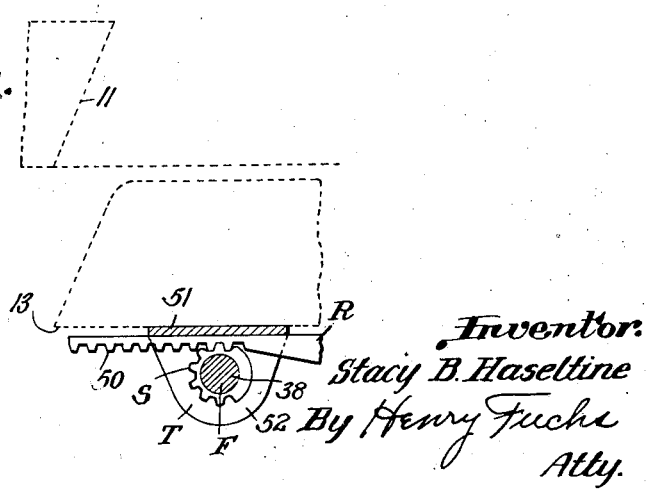

In the drawings, forming a part of this specification, Figure 1 is an elevational view, partly broken away, of the side wall of a refrigerator car, illustrating my improvements in connection therewith, said view showing the door closed. Figure 2 is a vertical sectional view, partly broken away, on an enlarged scale, corresponding substantially to the line 2—2 of Figure 1, but showing the door withdrawn from the door opening. Figure 3 is a horizontal sectional view, partly broken away, corresponding substantially to the line 3—3 of Figure 2. Figure 4 is a horizontal sectional view, on an enlarged scale, partly broken away, corresponding substantially to the line 4—4 of Figure 1. Figure 5 is a horizontal sectional view, on an enlarged scale and partly broken away, corresponding substantially to the line 5—5 of Figure 1, but showing the door withdrawn from the door opening. Figure 6 is a perspective view of a set of cooperating end and crank members of the operating means of my improved mechanism, said members being shown disassembled, and the end member being partly broken away. Figure 7 is a perspective view, partly broken away, of a certain bearing bracket for supporting one of the end members, said end member being indicated in dotted lines in said view. Figure 8 is a vertical sectional view, on an enlarged scale, corresponding substantially to the line 8—8 of Figure 1, said view being broken away. Figures 9, 10, 11, and 12 are views, similar to Figures 3, 4, 6, and 7, respectively, showing another embodiment of the invention. Figure 13 is a view, similar to Figure 1, showing the lower part only of the side wall of the car and car door and illustrating still another embodiment of the invention. Figure 14 is a horizontal sectional view corresponding substantially to the line 14—14 of Figure 13. Figure 15 is an enlarged elevational view of the locking member and cooperating parts shown at the left hand side of Figure 1. Figure 16 is a vertical sectional view, corresponding substantially to the line 16—16 of Figure 15. Figures 17, 18, 19, 20, and 21 are diagrammatic views, illustrating respectively the positions of the parts at successive stages during the operation of the door actuating mechanism disclosed in Figures 1 to 8 inclusive. Figures 22, 23, 24, 25, and 26 are diagrammatic views, illustrating respectively the positions of the parts at successive stages during the operation of the door actuating mechanism disclosed in Figures 9, 10, 11, and 12. Figures 27, 28, 29, 30, and 31 are broken, horizontal, sectional views, similar to Figure 14, on an enlarged scale, but showing the car wall and cooperating door in dotted lines, said figures illustrating the different positions of the parts during successive stages of the operation of the mechanism disclosed in Figures 13 and 14.

Referring first to the embodiment of the invention illustrated in Figures 1 to 8 inclusive, 15, 16, and 17 to 21 inclusive, 11 indicates the side wall of the car, which side wall is provided with the usual door opening 12 closed by a single door 13. In carrying out my invention as disclosed in Figures 1 to 8 inclusive, 15, 16, and 17 to 21 inclusive, I provide broadly top and bottom tracks A—A; carriers B—B and B—B cooperating with the top and bottom tracks A—A; pairs of top and bottom combined supporting and journal brackets C—C and C—C; pairs of top and bottom crank members D—D and D—D; a pair of vertically disposed operating shafts or bars E—E; end members F—F and F—F on said shafts operatively connected with the crank members D—D and D—D; an operating handle lever G on each bar; a latch bracket H for holding said levers in one position; and locking members K—K for locking said levers in another position.

The tracks A—A are of similar design, but reversely arranged, the top track facing downwardly and the bottom track facing upwardly. As will be understood, the tracks A—A are of such a length that the door 13 may be slid entirely clear of the door opening 12. Each track A is formed by a longitudinally extending flat bar 14 and a bar 15 of substantially Z-shaped cross-section, as shown most clearly in Figure 2. The bar 15 is secured to the bar 14 by means of bolts 16—16 or any other similar securing means, extending through the wall 11 of the car, the bar 14, and the flange 17 of the bar 15. As most clearly shown in Figure 2, the Z bar 15 is so arranged that the horizontal web 18 thereof forms the inner wall of the guideway of the track A. The flanges of the Z bar 15 extend in oposite directions, as clearly shown in Figure 2, and the flange 19, which extends in opposite direction to the flange 17, is spaced from the front face of the bar 14, thereby providing a guideway or slot between said bar 14 and the flange 19. The bottom wall 18 of the guideway of the bottom track serves as supporting means for the carriers B—B which cooperate therewith.

The carriers B—B, which cooperate with the top and bottom tracks, are of similar design with the exception that the carriers B, which cooperate with the lower track A, are provided with rollers for supporting said carriers. Each carrier B is in the form of a casting provided with a central, vertically disposed, journal opening 20, adapted to receive a bearing pin of the corresponding crank member D. The carriers B—B and B—B are of such a width that they are slidably guided between the upstanding flanges of the tracks A—A. The carriers B—B, which cooperate with the bottom track A, have openings 21—21 therein, which are in the form of pockets and accommodate the rollers 22—22. Each carrier is provided with two rollers 22—22, said rollers being supported on bearing pins 23—23.

The journal brackets C—C, which are four in number, are arranged in vertically aligned pairs at opposite edges of the door 13. The journal brackets C—C and C—C are of identical design, each comprising a relatively large plate section 24, which is secured to the outer side of the door 13, a bearing cap 25 at the outer end, and a second bearing cap 26 at the inner end, said bearing caps being secured to the plate section 24. The outer end of the bearing plate section 24 and the cap 25 are provided with cooperating part bearing sections, which together form a cylindrical bearing member for the shaft portion of the corresponding crank member D. At the inner end, the plate 24 is provided with a laterally, outwardly extending, lug 27, which engages within an opening 28 of the bearing cap 26. The bearing cap 26 and the lug 27 are formed with part bearing sections, which together define an inclined bearing slot 29, as clearly shown in Figures 3 and 4. Between the bearing caps 25 and 26, the journal bracket C is provided with an opening 30 so as to provide clearance for certain rotary crank arms, hereinafter more clearly described. Each bracket C is secured to the door 13 by means of securing elements 31—31, which extend through the bearing plates, the plate section 24, and the door 13. As shown, the securing elements 31—31 are in the form of bolts, but any other equivalent securing means may be employed. The journal brackets C—C, which are disposed at the top and bottom of the door 13, are reversely arranged, as clearly illustrated in Figure 1, and each pair of brackets cooperates with one of the operating members, which control the movement of the door toward and away from the door opening.

The crank members D—D, which are four in number, are of similar design and are arranged in pairs at opposite ends of the operating members. Each crank member D comprises a vertically disposed, relatively short, shaft portion 32, which is journaled in the cylindrical bearing at the outer end of the corresponding journal bracket C; a crank arm 33 at the outer end of the shaft 32 and a relatively shorter crank arm 34 at the inner end of said shaft. The crank arm 33 is provided at its outer end with a vertically projecting crank pin 35, which is journaled in the opening 20 of the corresponding carrier B. The inner crank arm of the member D is provided wih a vertically disposed bearing opening 36 at its outer end for a purpose hereinafter described. The crank members D—D are so arranged that the crank arms 33—33 thereof clear the top and bottom edges of the door, as shown in Figures 1 and 2.

The operating bars or shafts E—E are preferably of rectangular cross-section and serve to connect the parts of the operating members. Each shaft E has the end members F—F secured to opposite ends thereof. Each member F has a socket portion 37 at the inner end thereof, which socket portion is of rectangular cross-section to fit the corresponding end of the shaft E. Outwardly of the socket portion 37, each member F is provided with a cylindrical shaft section 38 which fits within the slot 29 of the corresponding journal bracket C. The shaft section 38 is of such a diameter that it is freely slidable and rotatable within the slot 29. At the outer end, the shaft 38 is provided with a crank arm 39 having a crank pin 40 at the outer end thereof, which is journaled in the bearing opening 36 of the arm 34 of the cooperating crank member D. As will be evident upon reference to Figures 3 and 4, the crank arm 39 is shorter than the crank arm 34 of the cooperating crank member D, thereby providing means for effecting a reduction in the degree of rotary motion transmitted to said member D. To compensate for this action, the shaft E is arranged to travel laterally in the slots of the bearing brackets C—C.

Each operating bar or shaft E is provided with an actuating lever G, which is pivoted on the end member F at the bottom end of the corresponding shaft E. The lever G, as most clearly shown in Figures 1 and 2, is forked at its inner end, as indicated at 41, so as to embrace the shaft E. Adjacent to said forked section, the lever G is provided with a pair of depending pivot lugs 42—42, which embrace an outstanding lug 43 on the end member F. The pivot pin 44, which extends through the lugs 42—42 and 43, serves to permit swinging movement of the lever G in a vertical plane. As shown most clearly in Figure 1, the inner end of the lever G between the arms of the forked section is cut away, as indicated at 45, to provide an inclined wall which allows for clearance during upward swinging movement of the lever G.

The plate H, which is secured to the outer side of the door, serves as holding means for the outer ends of the levers G—G when the door has been withdrawn from the door opening, so that the same will be held in proper position while being slid along the tracks A—A. The plate H has pockets 47—47 at opposite sides thereof to receive the outer ends of the levers G—G. In order to engage the outer ends of the levers G—G with the pockets 47—47, the levers are raised to a position that they will clear the front walls of said pockets and are then permitted to drop within the same.

The latch members K—K are of the type usually employed in connection with handles of refrigerator car door operators, and are used to lock the handles in fixed position when the door is closed. Each latch member K is also provided with the usual car sealing means. The two latch members K—K are of like design and operate in a similar manner, and therefore one only of the same need be described in detail. As shown most clearly in Figures 15 and 16, which illustrate the latch member at the right hand side of Figure 1, this latch member comprises a base plate 54 secured to the door and a swinging latch plate 55 pivoted on the plate 54 by means of a pivoted member 56. The lower end of the latch plate 55 engages over the handle lever G to lock the latter in position when the door is closed as shown in Figure 1. The upper end portion of the latch plate 55 and the base plate 54 are provided with the usual aligned car seal receiving openings 57—57, as is common in this art. To unlock the handle lever G, the latch plate 55 is swung to the dotted line position shown in Figure 15 to completely clear said handle lever.

The operation of my improved door construction, as illustrated in Figures 1 to 8 inclusive, 15, 16, and 17 to 21 inclusive, is as follows: In opening the door, the levers G—G are unlatched so that they may be swung outwardly away from the wall of the car and the two door operators may then be actuated in sequence or simultaneously. When the handle G of the door operator is swung outwardly away from the car, the corresponding shaft or bar E will be rotated therewith, thus causing rotation of the crank arms 39—39 at the outer ends of the end members F—F. Through engagement of the crank pins 40—40 of the crank arms 39—39 with the crank arms 34—34 of the crank members D—D, the latter will also be rotated, thereby causing the arms 33—33 at the outer ends of the crank members D—D to swing from the position shown in Figure 4 to that shown in Figure 3. During this action the parts of the mechanism will be moved as diagrammatically illustrated in Figures 17 to 21 inclusive, successively assuming the positions shown in Figures 17, 18, 19, 20 and 21, respectively. Inasmuch as the crank pins 35—35 of the arms 33—33 are journaled in carriers B—B, which are held against lateral movement, the crank arms 33—33 will effect outward movement of the door 13. During the operation described, the shaft portions 38—38 of the end members E—E will travel outwardly and inwardly of the slots 29—29 of the supporting journal brackets C—C. This movement of the shaft portions 38—38 in the slots 29—29 is necessary in order to permit relative movement of the connected crank members without binding of the parts. As shown in Figure 5, each arm 34 is provided with a stop lug 60 which engages the platelike portion 24 of the corresponding bracket C to limit rotation of said arm when the door has been completely withdrawn from the door opening. As will be evident upon reference to Figures 3, 4, and 5, the operating parts of the mechanism are so arranged that the projection thereof from the door comes within prescribed limits so that the mechanism will not interfere with obstructions encountered in railway practice. When the door has been thus withdrawn from the door opening, the ends of the levers G are dropped within the pockets 47 of the member H and the door is slid along the tracks A—A to completely clear the door opening.

In closing the door, the same is slid in front of the door opening and is then forced inwardly by operation of the shafts E—E and the connected crank members D—D and D—D in a reverse direction to that hereinbefore described. During this action, the door is moved from the position shown in Figures 3 and 5 to that shown in Figure 4.

As will be evident, the arrangement of connecting crank arms between the shaft E and the carriers B—B is such that there will be a rapid inward movement during the first part of the door closing operation and the final forcing of the door into the opening 12 is effected with increased power. Inasmuch as the greatest force is applied to the arms 33—33 and 33—33 during the initial opening movement of the door, binding between the engaging faces of the door and the walls of the door opening is effectively overcome. This is of especial importance in connection with the operation of doors for refrigerator cars because these doors frequently become stuck due to frost forming in the crevices between the door and walls of the door opening.

Referring next to the embodiment of the invention illustrated in Figures 9, 10, 11, 12, and 22 to 26, inclusive, the mechanism comprises two operating bars mounted at opposite ends of the outer side of the door 13, which bars are similar to the bars E—E, hereinbefore described. Each bar is provided with end members similar to the end members F—F. As shown in Figures 9, 10, 11, 12, and 22 to 26, inclusive, the end member which corresponds to the member F, hereinbefore described, is indicated by W and has a shaft section 138 corresponding to the shaft section 38 journaled and slidable in a relatively short inclined slot 129 in the journal bracket N, which corresponds to the journal bracket C, hereinbefore described. At the outer end of the shaft 138, the member W is provided with a short crank arm 130, having a crank pin 140 in its outer end engaging within a guide slot 136 formed in a crank arm 134, corresponding to the crank arm 34 on the member D, hereinbefore described in connection with Figures 1 to 8 inclusive. The crank member, which corresponds to the member D in Figures 1 to 8, is indicated by P in Figures 9, 10, 11, and 12. The crank member P is journaled in a cylindrical bearing opening at the outer end of the bracket N and has a crank arm 133 thereon similar to the crank arm 33, hereinbefore described, and cooperates in a similar manner with the carrier B of the track A. The operation of the mechanism disclosed in Figures 9, 10, 11, and 12 is the same as that of the mechanism hereinbefore described, with the exception that the crank pin of the end member has lost motion with respect to the crank arm of the member P and that the movement of the shaft portion of the end member W in the slot 129 of the journal bracket N is less than the movement of the shaft 38 in the slot 29 of the journal bracket C of the mechanism in Figures 1 to 8 inclusive. In opening the door, the door rotation of the end member W in a contra-clockwise direction by means of the operating shaft effects movement of the door from the position shown in Figure 10 to that shown in Figure 9. During this action the various parts of the mechanism will be moved as diagrammatically illustrated in Figures 22 to 26 inclusive, successively assuming the positions shown in Figures 22, 23, 24, 25, and 26. In closing the door, the operating shaft is rotated in a reverse direction, thus actuating the door from the position shown in Figure 9 to that shown in Figure 10 and moving the parts of the mechanism as indicated in Figures 22 to 26 inclusive from the position shown in Figure 26 successively through the positions shown in Figures 26, 25, 24, and 23, respectively, to the position shown in Figure 22.

Referring to the embodiment of the invention disclosed in Figures 13, 14, and 27 to 31 inclusive, the construction of the operating shafts E—E, end members F cooperating with the shafts E, the crank members D, carriers B, and the tracks A—A, is the same as shown in Figures 1 to 8 inclusive. The arrangement shown in Figures 13 and 14 differs from that disclosed in Figures 1 to 8 inclusive in that means is provided for operating both shafts E—E simultaneously when the operating lever G of one of the shafts is actuated. As shown in Figure 13, the left hand shaft E only is provided with an operating lever G. The lower end members F—F of the shafts E—E are connected for simultaneous operation by means of a sliding rack R, which has rack teeth 50—50 at opposite ends thereof meshing with pinions S—S fixed to or formed integral with the end members F—F. The rack bar is slidingly supported by a pair of brackets T—T, which are mounted on the cylindrical shaft sections of the end members F—F. Each bracket, as shown in Figures 13 and 14, has a vertical inner wall 51 and spaced top and bottom walls 52—52, which embrace the pinions S and the corresponding end of the rack bar R. The top and bottom walls 52—52 of each bracket T are provided with aligned openings through which the shaft section of the member T passes. The toothed section at the end of the rack bar R is disposed between the wall 51 of the corresponding bracket T and the pinion S. As will be evident, the shaft sections of the end members F—F are freely rotatable with respect to the brackets T—T when the brackets are carried inwardly and outwardly with the shafts E—E during movement of the shaft sections of the end members F—F in the slots 29—29 of the journal brackets C—C. As will be evident, swinging movement of the operating handle G in actuating the shaft E and the connected crank members at the left hand end of the door 13 will cause the rack to slide lengthwise of the door, thereby simultaneously operating the shaft E and the connected crank members at the other end of the door in the same direction. In opening the door, the rack R will be moved to the left as viewed in Figures 13, 14, and 27 to 31 inclusive, thereby rotating the shafts and the connected end members F—F in a contra-clockwise direction, thereby swinging the crank arms D as illustrated in Figures 17, 18, 19, 20, and 21. Due to the end members F—F moving outwardly in the slotlike guide openings of the bearing brackets C, the rack R will be carried successively outwardly away from and inwardly toward the door during said opening operation as illustrated in Figures 27 to 31 inclusive. With the door closed, the operating mechanism is in the position shown in Figures 27 and 17. As the shaft F is rotated in contra-clockwise direction, the parts successively assume the positions shown in Figures 28 and 18, 29 and 19, 30 and 20, 31 and 21. In closing the door, the movement of the parts of the mechanism will be in a reverse direction, that is, from the position shown in Figures 31 and 21 through the positions shown in Figures 30 and 20, 29 and 19, 28 and 18, to the closed position shown in Figures 27 and 17. In order to hold the operating lever G in locked position when the door has been moved outwardly for sliding movement on the track A, the end of the operating bar G, as shown in Figures 13 and 14, is engaged in back of a lug 53 provided at the center of the rack bar R.

From the preceding description, taken in connection with drawings, it will be evident that I have provided simple and efficient operating means for controlling the movements of a sliding door for refrigerator cars, and a design wherein the door is positively held against lateral movement with respect to the supporting brackets when the door is slid along the side wall of the car.

I have herein shown and described what I now consider the preferred manner of carrying out my invention, but the same is merely illustrative and I contemplate all changes and modifications that come within the scope of the claims appended hereto.

I claim:

1. In a door construction for refrigerator cars having a wall member provided with a door opening, the combination with a single door adapted to close said opening; of guide tracks on said wall member above and below said door opening; a carrier slidably guided on each track; operating members at the top and bottom of said door, each operating member comprising a shaft, an elongated crank arm at the outer end of the shaft, and a relatively short crank arm at the inner end of the shaft; a crank pin at the outer end of the elongated arm journaled on the corresponding carrier, said short arm having a bearing opening at the outer end thereof; a rotary actuating shaft on the door; top and bottom bearing brackets on said door, said brackets having vertically aligned bearing slots in which said shaft is rotatable and laterally slidable; and crank arms at opposite ends of said shaft having crank pins at their outer ends, journaled in the bearing openings of the short crank arms of said operating members.

2. In a door construction for refrigerator cars having a wall member provided with a door opening, the combination with a single door adapted to close said opening; of guide tracks on said wall member above and below said door opening; a carrier slidably guided on each track; a rotary actuating shaft on the door; bearing means on the door in which said shaft is supported for rotation and lateral sliding movement; operating members at the top and bottom of the door, each of said operating members including a cylindrical bearing portion having an elongated crank arm at the outer end; means for journaling the outer end of said crank arm on the corresponding carrier; relatively short crank arms at the inner ends of said cylindrical bearing portions; relatively short crank arms at opposite ends of said shaft; and pivot means rotatably connecting the outer ends of the crank arms of said shaft with the outer ends of the short crank arms of the operating members.

3. In a door construction for refrigerator cars having a wall member provided with a door opening, the combination with a single door adapted to close said opening; of guide tracks on said wall member above and below said door opening; a carrier slidably guided on each track; operating members at the top and bottom of said door, each operating member comprising a shaft portion, an elongated crank arm at the outer end of the shaft, and a second crank arm at the inner end of the shaft; bearing means at the outer ends of said elongated crank arms, journaled on said carriers, each of said second named arms having a bearing slot at the outer end; a rotary actuating bar on the door; top and bottom bearing brackets on said door, said brackets having vertically aligned bearing slots in which said bar is rotatable and laterally slidable; crank arms at opposite ends of said bar; and crank pins at the outer ends of said last named arms having both rotary and sliding movement in the slots of said second named arms.

4. In a door construction for refrigerator cars having a wall member provided with a door opening, the combination with a single door adapted to close said opening; of guide tracks on said wall member above and below said door opening; a pair of carriers slidably guided on each track; sets of top and bottom operating members at opposite ends of the door, each set of operating members being journaled on the door for rotation about vertically aligned axes; each operating member having crank arms at the inner and outer ends thereof, the outer crank arms of each set having their outer ends journaled on the top and bottom carriers at the corresponding end of the door; vertically disposed, rotary operating bars at opposite ends of the door; crank arms at the opposite ends of each bar; means for pivotally connecting the outer ends of said last named crank arms to the outer ends of the crank arms at the inner ends of the corresponding top and bottom operating members; and bearing means on the door having slots in which the opposite ends of said bars are rotatable and laterally slidable.

5. In a door construction for refrigerator cars having a wall member provided with a door opening, the combination with a single door adapted to close said opening; of guide tracks on said wall member above and below said door opening; a pair of carriers slidably guided on each track; sets of top and bottom operating members at opposite ends of the door, each set of operating members being journaled on the door for rotation about vertically aligned axes; each operating member having crank arms at the inner and outer ends thereof, the outer crank arms of each set having their outer ends journaled on the top and bottom carriers at the corresponding end of the door; vertically disposed, rotary operating bars at opposite ends of the door; crank arms at opposite ends of each bar; means forming a sliding pivotal connection between the outer ends of said last named crank arms and the outer ends of the crank arms at the inner ends of the corresponding top and bottom operating members; and bearing means on the door having slots in which the opposite ends of said bars are rotatable and laterally slidable.

6. In a door construction for refrigerator cars having a wall member provided with a door opening, the combination with a single door adapted to close said opening; of guide tracks on said wall member above and below said door opening; a pair of carriers slidably guided on each track; sets of top and bottom operating members at opposite ends of the door, each set of operating members being journaled on the door for rotation about vertically aligned axes; each operating member having crank arms at the inner and outer ends thereof, the outer crank arms of each set having their outer ends journaled on the top and bottom carriers at the corresponding end of the door; vertically disposed, rotary operating bars at opposite ends of the door; crank arms at the opposite ends of each bar; means for pivotally connecting the outer ends of said last named crank arms to the outer ends of the crank arms at the inner ends of the corresponding top and bottom operating members; bearing means on the door having slots in which the opposite ends of said bars are rotatable and laterally slidable; lever means for rotating one of said bars; and rack and pinion means for transmitting rotary motion from one bar to the other.

7. In a door operating mechanism, the combination with means for forcing said door either open or closed; of a pair of parallel spaced rotary actuating bars for operating said first named means; supporting brackets on the door in which said bars are journaled; guide brackets carried by said bars a slidable rack bar supported in said guide brackets; pinions on said actuating bars meshing with said rack bar; and a lever fixed to one of said actuating bars for rotating the latter.

8. In a door construction for refrigerator cars having a wall member provided with a door opening, the combination with a single door adapted to close said opening; of guide tracks on said wall member above and below said door opening; a pair of carriers slidably guided on each track; sets of top and bottom operating members at opposite ends of the door, each set of operating members being journaled on the door for rotation about vertically aligned axes; each operating member having crank arms at the inner and outer ends thereof, the outer crank arms of each set having their outer ends journaled on the top and bottom carriers at the corresponding end of the door; vertically disposed, rotary operating bars at opposite ends of the door; crank arms at the opposite ends of each bar; means for pivotally connecting the outer ends of said last named crank arms to the outer ends of the crank arms at the inner ends of the corresponding top and bottom operating members; bearing means on the door having slots in which the opposite ends of said bars are rotatable and laterally slidable; a bracket carrier by each bar in which said bar is freely rotatable; a rack bar having its opposite ends slidable in said brackets; a pinion on each operating bar meshing with said rack bar; and an operating hand lever for rotating one of said bars.

9. In a mechanism for forcing a door into and withdrawing the same from a door opening, the combination with a swinging arm for supporting the door; of a rotary and laterally displaceable operating bar mounted on the door; a crank arm on said bar, said crank arm having a crank pin at its outer end; a shaft fixed to said supporting arm and about the axis of which said arm is rotatable; and a crank arm fixed to said shaft, said last named arm having a bearing opening at its outer end in which said crank pin of said first named crank arm is journaled.

10. In a mechanism for forcing a door into and withdrawing the same from a door opening, the combination with a shaft rotatably supported on the door; a radial arm on one end of said shaft pivotally supported at its outer end; a radial arm at the other end of said shaft; a bearing bracket supported on said door; a rotary operating bar, rotatable and laterally displaceable in said bracket; a fixed radial arm on said bar; and means pivotally connecting the outer ends of said second and third named arms.

11. In a mechanism for forcing a door into and withdrawing the same from a door opening, the combination with an actuating shaft; of a bearing for said shaft on the door, said bearing having an elongated slot in which said shaft is journaled, said shaft being guided for lateral movement in said slot; a radial arm on said shaft; a second shaft rotatably supported on said door, said last named shaft having radially projecting fixed arms at opposite ends, one of the arms of said last named shaft being swingingly supported at its outer end; and means operatively connecting the other arm of said last named shaft to the arm of the first shaft, said means comprising a crank pin on one of said last named arms working in a guideway on the other of said last named arms.

STACY B. HASELTINE.